(12) United States Patent
Haar

(10) Patent No.: US 9,409,324 B2
(45) Date of Patent: Aug. 9, 2016

(54) METHOD AND DEVICE FOR APPLYING A SEALING COMPOUND TO A SURFACE

(75) Inventor: Thomas Haar, Halstenbek (DE)

(73) Assignee: SAETA GMBH & CO. KG, Wedel (DE)

( * ) Notice: Subject to any disclaimer, the term of this patent is extended or adjusted under 35 U.S.C. 154(b) by 654 days.

(21) Appl. No.: 13/391,969

(22) PCT Filed: Aug. 27, 2010

(86) PCT No.: PCT/EP2010/005276
§ 371 (c)(1),
(2), (4) Date: Mar. 20, 2012

(87) PCT Pub. No.: WO2011/023399
PCT Pub. Date: Mar. 3, 2011

(65) Prior Publication Data
US 2012/0171381 A1 Jul. 5, 2012

(30) Foreign Application Priority Data
Aug. 28, 2009 (DE) .................. 10 2009 040 802

(51) Int. Cl.
| | | |
|---|---|---|
| B29C 31/00 | (2006.01) |
| B29C 43/18 | (2006.01) |
| B05D 1/26 | (2006.01) |
| B05C 1/02 | (2006.01) |
| B05D 1/28 | (2006.01) |
| B05D 3/12 | (2006.01) |
| B29C 31/04 | (2006.01) |
| B29C 43/34 | (2006.01) |
| B29C 43/36 | (2006.01) |
| B29L 31/56 | (2006.01) |

(52) U.S. Cl.
CPC ............ B29C 43/18 (2013.01); B29C 31/048 (2013.01); B29C 43/34 (2013.01); B29C 2043/3433 (2013.01); B29C 2043/3626 (2013.01); B29L 2031/565 (2013.01)

(58) Field of Classification Search
None
See application file for complete search history.

(56) References Cited

U.S. PATENT DOCUMENTS

| 4,388,058 A | 6/1983 | Kubo | |
|---|---|---|---|
| 2003/0131927 A1 * | 7/2003 | Hatcher et al. | ............... 156/230 |
| 2009/0127744 A1 | 5/2009 | Hanot | |

FOREIGN PATENT DOCUMENTS

| EP | 0 462 513 A1 | 12/1991 | |
|---|---|---|---|
| EP | 0 499 108 A1 | 8/1992 | |
| EP | 1 527 864 A1 | 5/2005 | |
| EP | 1527864 A1 * | 5/2005 | ............. B29C 31/04 |
| JP | 6-312762 | 11/1994 | |
| JP | 2004042471 A * | 2/2004 | ............. B29C 43/18 |

* cited by examiner

*Primary Examiner* — Lisha Jiang
(74) *Attorney, Agent, or Firm* — Vidas, Arrett & Steinkraus, P.A.

(57) ABSTRACT

A device for applying a sealing compound into a closure cap for containers comprising:
- an outer stamp (18) and a concentric inner stamp (14), the stamps being movable with respect to each other,
- an annular gap (26) between the stamps (14, 18), which is open towards the outside or the inside and of which at least one section is variable between an initial gap width and a gap width zero in the movement direction of the stamps in an axial relative movement of the stamps (14, 18),
- a feeding system for plasticized sealing compound within a stamp, which is connected to the annular gap (26),
- a mechanism that prevent any reflux of the melt from the annular gap, and
- adjustment mechanism for at least one of the stamps for changing the gap width of the annular gap.

10 Claims, 3 Drawing Sheets

METHOD AND DEVICE FOR APPLYING A SEALING COMPOUND TO A SURFACE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for applying a sealing compound to a surface, preferably into a closure cap for containers.

Closure caps for containers, glasses or similar containers mostly have a seal in the interior of the bottom, in order to seal the container content sufficiently with respect to the atmosphere.

It is known to incorporate such seals in the form of sealing compounds, preferably in ring shape. It is known to use PVC as a material for this, which is provided with a plasticizer for reasons of process technology and for purposes of sealing. However, plasticizers have the property to escape from the PVC to a certain extent. This is increasingly disapproved or officially forbidden for reasons of health and environment. PVC is applied at 40-65° C. in liquid form by way of an injection nozzle.

If another plastic material like TPE, for example, is used instead of PVC, the plastic material for such seals is plasticized in a suitable way at first, and then the melt is applied into the interior of the cap with the aid of a suitable device. Such a device has become known from EP 1 527 864. It has an outer, sleeve-shaped and height-movable stamp, in which is situated an inner height-movable stamp. A ring-slide slides on the outer side of the outer stamp, which separates an extrudate off from injection nozzles when it is shifted into a lower position, so that the extrudate is discharged into the ring space between a ring having the nozzle openings and the outer stamp. The extrudate is pressed against the inner bottom of the cap with the aid of the outer slide, wherein the ring slide and the inner stamp rest on the bottom and limit a ring-shaped moulding cavity by doing so. Disadvantageous in the known device are the imprecise portioning of the sealing material, the not uniform ring shape of the extrudate and the problem to cool the outer slide in the hot environment.

All approaches of a solution, as well as the patent described above, are affected by the great danger that the hot sealing compound adheres on surfaces that are not cold. This effect is per se known and is usually almost overcome by cooling the surfaces on which adherences are to be avoided. This problem also occurs with the known applicator and also with other applicators. The reason for this is that it is not possible to technically realise temperature differences of about 180° C. on a very narrow space.

Thus, the present invention is based on the objective to provide a method for annularly applying a sealing compound to a surface, into a closure cap for containers in particular, by which the sealing compound can be effectively discharged without that adherences or draw of thread occurs on outer surfaces of the applicator.

BRIEF SUMMARY OF THE INVENTION

In the method of the present invention, the plasticized sealing compound is annularly brought into a temperature-controlled annular gap having a variable gap width. By fast reduction of the gap width to zero, the sealing compound is completely squeezed out of the annular gap and formed to a ring-shaped structure radially surrounding the annular gap at the inner or the outer side. The ring-shaped structure can be applied immediately to the surface by being shot through the air for a certain distance.

The sealing compound or melt is squeezed out of the annular gap towards the inside or the outside, i.e. the walls of the applicator approach each other almost vertically to the direction of squeezing when it is reduced to zero. Thus, a relative reduction movement of the gap walls transversely to the direction of squeezing is understood as the reduction of the gap width. In a vertical movement of a wall of the annular gap, the gap width is reduced vertically. Here, the gap width corresponds to the vertical dimension of the annular gap.

It is essential for the present invention that upon squeezing the sealing compound out of the annular gap, the initial speed is sufficiently high, that partial adherences on the leaving edges of the annular gap do not occur. At constant speed of the reduction of the gap width, the exit speed of the sealing compound increases, as is well known. It is therefore also possible to permit a reduction of the gap width change speed upon ongoing cross section narrowing, as long as the exit speed remains sufficiently high.

It is further essential for the present invention that the annular gap is made zero in the squeezing process, in order to achieve a clean completion of the melt exit.

During the process of squeezing out of the annular gap, the supply to the annular gap is blocked. As the blocking process does not have to occur suddenly, means must be provided which prevent any back flow of the melt from the annular gap, a check valve for instance.

It has proven that as a consequence of the acceleration of the melt, adherences do no more occur. There is an exit speed above which adherences and draw threads do no more occur. By changing the closure speed of the gap, evidence can be provided that adherences and/or draw threads occur only below a minimum value of the speed.

In the method of the present invention, the ring-shaped structure squeezed out of the annular gap is preferably deposited immediately on a surface, for instance on the bottom of a closure cap, as was mentioned already. In order to bring it into its definitive shape, one embodiment of the present invention provides that the ring-shaped structure is subsequently pressed against the surface, the closure cap for instance, by a cold ring-shaped pressing tool and is thus formed to a flat sealing ring.

The exit opening of the annular gap can be directed radially towards the inside or the outside, even the orientation of the annular gap is not essential. The annular gap may be in a radial plane or it may run conically. These circumstances doe not play any role for achieving the goal to avoid adherences.

In the method of the present invention, it has proven that the surface tension of the melt has the result that possibly lagging hairs are drawn with and reabsorbed into the ring-shaped structure of melt material. Adhering hairs do not occur.

After the squeeze-out of the ring-shaped structure from the annular gap, it may occur that the ring-shaped structure is still connected via a fine film with those parts of an applicator that form the annular gap. In case that the ring-shaped structure deposited on the surface has no sufficient adhesion to the surface, undesired deformation of the structure might occur in the removal from the annular gap. Therefore, one embodiment of the present invention provides that the emergence end of the annular gap is positioned with respect to the surface such that the ring-shaped structure contacts the surface as soon as it has been squeezed out of the annular gap. A film possibly still existing between the closed annular gap and the ring-shaped structure is broken by subsequently lowering the temperature-controlled surface. The surface is preferably provided with an adhesion agent and sufficiently controlled in its temperature so that sufficient adhesion takes place between the ring-shaped structure and the surface, which makes it possible that an existing film breaks when the surface is removed from the annular gap, without occurrence of undesired deformation of the ring-shaped structure taking place. The ring-shaped structure is uniformly in contact with the surface, so that a uniform sealing ring is created upon subsequent pressing against the surface.

The method of the present invention is to be used in particular with vessel caps which are provided with an inner sealing ring. Such caps have frequently cams pointing radially towards the interior. Final contacting of such a sealing ring with the cap's inner surface takes place by pressing with the aid of a suitable pressing tool, which presses the sealing compound against the temperature-controlled cap, so that sufficient connection by adhesion takes place. However, this process can be realised only with relative difficulty in twist-off caps, at least with one single pressing tool or in one step, respectively. Therefore, it is already known to put the sealing compound into a blank and then press it, and to form the cap edge and the cams after this event. One embodiment of the present invention with a twist-off cap having a ring-shaped deepening on the inner side of the bottom of the twist-off cap for receiving the sealing ring provides that one single ring-shaped pressing stamp is used. The volume of the ring-shaped structure is dimensioned such that in the pressing process, the sealing compound is bead-like deformed beyond the edge of the deepening at least towards the outer side of the deepening. The deformation energy to be expended in this creates a sufficient pressure which produces a sufficiently intimate connection between the wall of the deepening and the sealing compound.

In order to execute the method of the invention, it is proposed to provide an outer stamp and an inner stamp in an applicator, the latter stamp being concentrically received in a cylindrical recess of the outer stamp. The stamps are axially movable with respect to each other. A suitable adjustment device serves for this. An annular gap is formed between the stamps, which is open towards the outside or the inside and whose gap width is changeable between an initial gap width and a gap width zero. The change of the gap width takes place in the direction of the shifting of the at least one stamp. The walls of the annular gap run preferably in parallel to each other.

A feeding system for plasticized sealing compound from a metering device into one of the stamps is connected to the annular gap, when the latter is in its initial position. The feeding system to the annular gap is uniformly distributed over the same, for instance via small, uniformly distributed openings to the annular gap. The channels to the openings and the former themselves provide for symmetric hydraulic conditions, and thus for uniform distribution of the melt in the annular gap. The flow cross section of the channels to the annular gap is smaller in its entirety than that of a supply channel to the channels or openings, respectively. When the gap width is reduced, flowing back of the melt into the supply channel is prevented by suitable measures in the upstream, like by a check valve for instance.

In one embodiment of the present invention, the inner stamp is provided with a radial conical flange on its lower end, which forms the annular gap with the outer stamp. The feeding system for plasticized material can have an axial channel in the inner stamp, which is connected to a series of radial channels which for their part run out into the annular gap when the same has its initial gap width.

Depending on the nature and the viscosity of the sealing material, it might happen that it exits from the open annular gap before the squeezing process for the production of the ring-shaped structure takes place. Therefore, one embodiment of the present invention provides that a ring channel or a ring-shaped extension is formed between the annular gap and the feeding system, in which plasticized sealing material accumulates. The ring channel is preferably formed in the outer stamp at the outside. This ring channel serves for the retention even of melt having lower viscosity, before it is ejected out of the annular gap. After the ejection of the melt via the closing annular gap, a residual amount of the melt remains in the ring channel. It has proven that it can be prevented by this measure that even melts having lower viscosity flow out of the annular gap before the latter is being closed.

BRIEF DESCRIPTION OF THE SEVERAL VIEWS OF THE DRAWINGS

An example of the invention's realisation will be explained in more detail in the following by way of drawings.

DETAILED DESCRIPTION OF THE INVENTION

Figure 1:
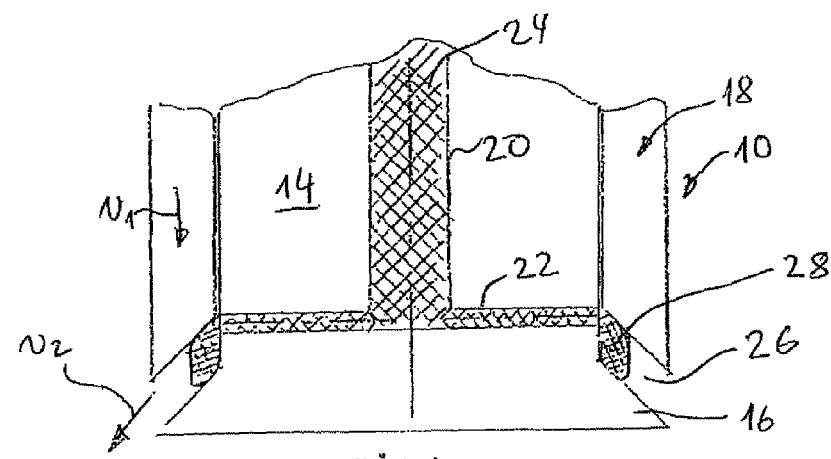
FIG. 1 shows a section through an applicator for applying a sealing compound into a closure cap for a container, in a very schematic depiction.

While this invention may be embodied in many different forms, there are described in detail herein a specific preferred embodiment of the invention. This description is an exemplification of the principles of the invention and is not intended to limit the invention to the particular embodiment illustrated In FIGS. 1 and 2, an applicator 10 for applying a sealing compound into a closure cap 12 (FIG. 2) is shown in a very schematic depiction. It has an inner stamp 14, which has a conical flange 16 on its lower free end. The inner stamp 14 is annularly surrounded by an outer stamp 18. The cylindrical stamps 14, 18 are concentric and axially movable in respect to each other with the aid of a not shown shifting device. In the shown realisation example, the outer stamp 18 is movable in respect to the inner stamp 14.

In the inner stamp 14 there is an axial channel 20, which is connected to a not shown extruder or to another apparatus for making a melt of sealing material. The channel 20 is connected to several uniformly distributed radial channels 22 at its lower end. The overall cross section of the channels or bores 22 is small and smaller than that of the axial channel 20.

Through this, the uniform distribution of the melt in the annular gap is ensured. In the channels 20, 22 there is melt 24.

As can be recognised from FIG. 1, a conical annular gap 26 can be formed between the inner and the outer stamp 14, 18 which is cylindrical farther towards the inside and the upside. Its walls are parallel and its bottom is formed by the outer side of the inner stamp 14. FIG. 1 shows the initial gap width in which the radial channels 22 are connected to the annular gap 26. As can be further recognised in FIG. 1, melt of for instance TPE is annularly brought into the gap 26 by a corresponding extrusion- or melting process, as foreshadowed at 28.

Figure 2:
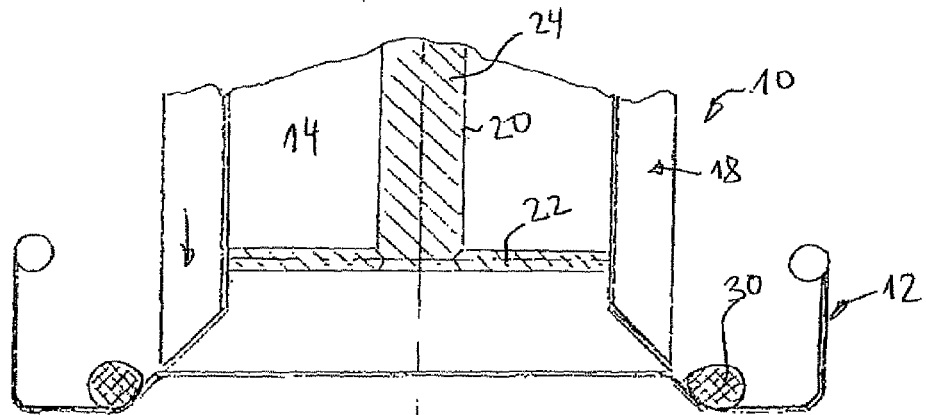
FIG. 2 shows the applicator of FIG. 1 after completed incorporation of the sealing compound.

In order to discharge the melt 28 into the closure cap 12, as depicted in FIG. 2, the annular gap 26 is reduced with velocity V1 by vertical shift of the outer stamp 18 up to gap width zero, as foreshadowed in FIG. 2. In the latter, the walls of the annular gap sit against each other in a close fitting manner. The melt 28 exits from the annular gap 26 with velocity V2, so that a ring-shaped structure 30 of plasticized sealing compound is formed. In order to incorporate this structure 30 into the closure cap 12, the arrangement consisting of inner and outer stamp 14, 18 approaches the closure cap 12, as this is depicted in FIG. 2. Thus, an additional tool for incorporating the ring-shaped structure 30 emerging from the annular gap 26 into the closure cap 12 is not necessary. After the ring-shaped structure has been formed, it rests on the bottom of the cap (FIG. 2). Instead of a cap, even another surface can be provided with a ring-shaped seal.

However, in the described process it is essential that the initial velocity V1 and the initial exit velocity V2, respectively, have and maintain a minimum value in order to prevent adherence of melt on the outer edges of the annular gap 26. This is reliably achieved with the selected minimum exit velocity V2.

When squeezing out the ring-shaped structure 30, it might happen that it is still connected to the applicator via a fine film. If the ring-shaped structure rests on the inner cap bottom with insufficient adhesion, it may happen in its removal from the annular gap that the ring-shaped structure is subject to deformation. Thus, it is advantageous if the ring-shaped structure 30 immediately enters into contact with the cap when it is being squeezed out and formed. The cap is provided with a suitable adhesive agent, as is per se known. In addition, it is brought to a necessary temperature in suitable manner. The uniform rest of the ring-shaped structure 30 on the cap immediately after the ring-shaped structure has been formed causes sufficient adhesion between the ring-shaped structure 30 and the associated cap surface, so that the possibly still existing film breaks in the subsequent lowering of the cap 12 with respect to the applicator 10, without occurrence of undesired deformation of the ring-shaped structure 30.

In the shown case, the selected geometrical shape of the applicator 10 or the conical annular gap, respectively, results through the shown so-called twist-off cap 12. Other orientations of the annular gap 26 can be advantageous for other closure caps and other distributions of the sealing compound.

Figure 3:
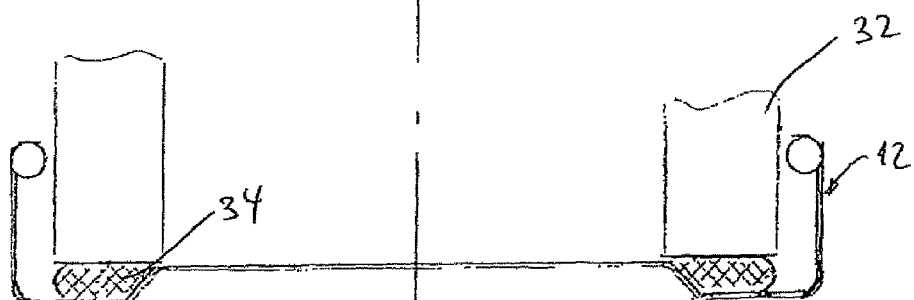
FIG. 3 shows the final deformation of the sealing compound in the closure cap.

In FIG. 3, it is shown how the ring-shaped structure 30 is formed into a flat planar seal ring 34 with the aid of a ring-shaped stamp 32 which is cooled. During the described application process, the stamps 14, 18 of FIGS. 1 and 2 are sufficiently temperature controlled, so that the melt remains capable of flow.

Figure 4:
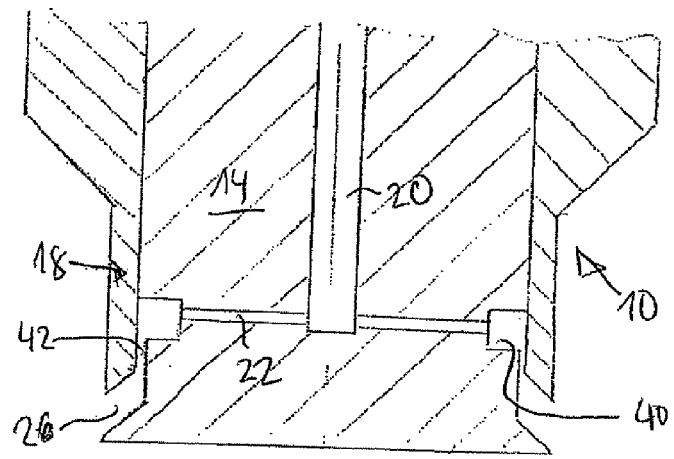
FIG. 4 shows a similar depiction like FIG. 1 or 2, with an additional ring channel.
Figure 5:
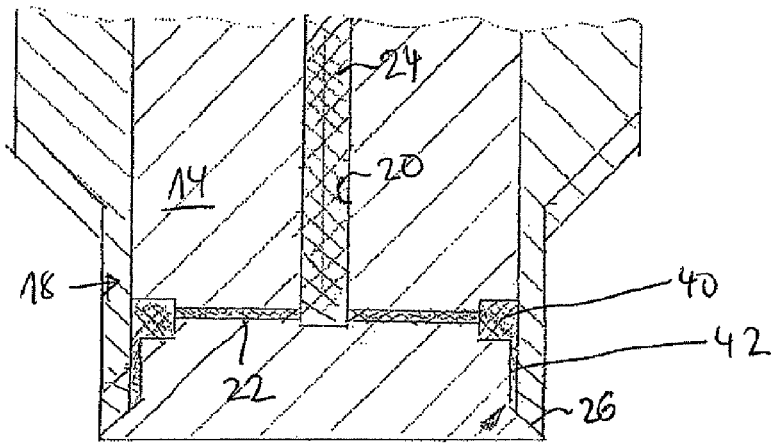
FIG. 5 shows the depiction of FIG. 4 after closing the annular gap.
Figure 6:
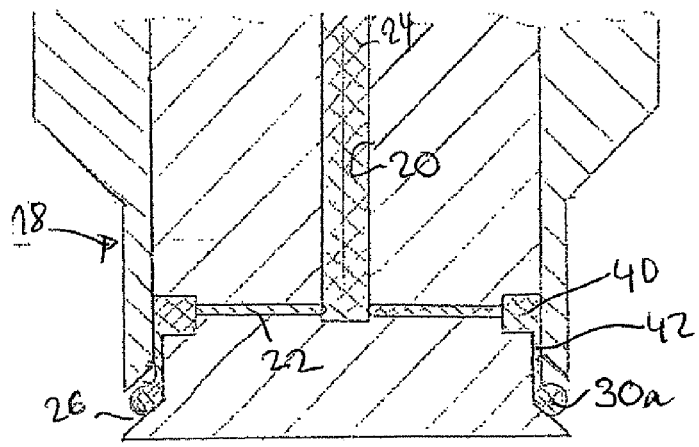
FIG. 6 shows the incorporation of the melt into the annular gap before the annular gap is closed for making the ring-shaped structure.

The applicator shown in FIGS. 4 to 6 is essentially similar to that of FIGS. 1 to 3. Due to this, equal parts have been provided with equal reference signs. The distinctive feature in FIGS. 4 to 6 is a ring channel 40 rectangular in cross section, which is formed into the stamp 14 at the outside and is in connection with the bores 22. The ring channel 40 is open towards the cylindrical gap 42 between the stamps 14, 18 which is guided downward to the conical annular gap 26. From FIG. 5, it becomes clear that ring channel 40 and cylindrical gap 42 are filled with plasticized compound when the conical annular gap is closed. In FIG. 6, the annular gap 26 is opened and one recognises the melt 30a exiting in a metered manner, which does not "leak out" however due to the action of the ring channel 40, but remains in the annular gap 26. The squeeze-out of the sealing material takes place subsequently, as this has already been explained by means of FIGS. 1 and 2. After the squeeze-out we have a condition as can be recognised in FIG. 5. In that the newly supplied melt must push the remaining melt out of the ring channel 40 at first, a favourable distribution arises in the annular gap 26, which prevents the unintended exit of melt from the annular gap 26 before the annular gap is being closed, even then when the melt has a relatively low viscosity.

Figure 7:
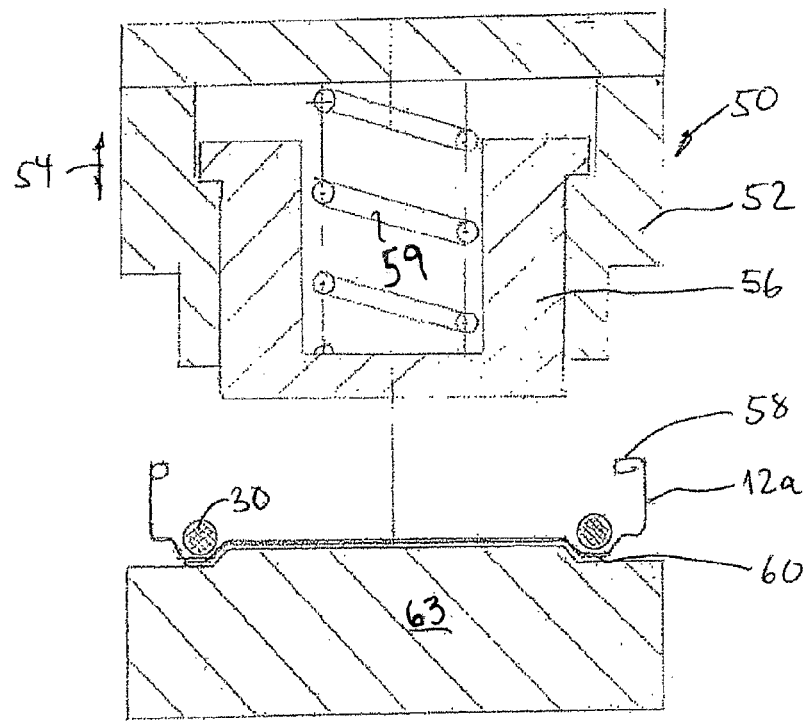
FIG. 7 shows in a schematic section a tool for forming the ring-shaped structure according to the present invention into a twist-off cap.
Figure 8:
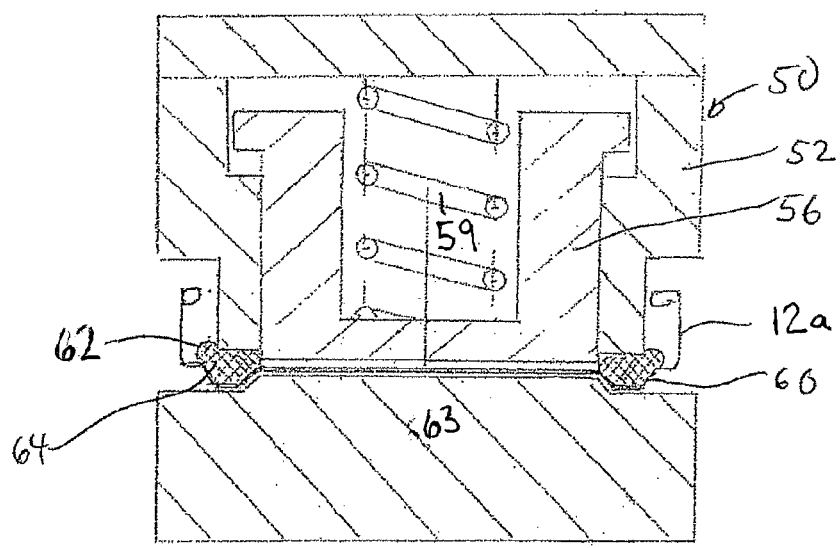
FIG. 8 shows the depiction of FIG. 7 during the pressing process.

A tool 50 is shown in FIGS. 7 and 8, in modification of the tool 32 of FIG. 3. The tool 50 has an outer ring-shaped third stamp 52, which is vertically movable in the direction of the double arrow 54 by a not shown actuation device. An inner fourth stamp 56 is supported on the outer stamp 54 via a spring 58. In FIGS. 7 and 8, one further recognizes a twist-off cap 12a with cams 59 and a ring-shaped deepening 60 into which the ring-shaped structure 30 of FIG. 2 will be deposited. The cap 12a rests on a support 63. The tool 50 serves for pressing the ring-shaped structure 30 in the deepening 60 against the cap 12a. The pressing surface of the stamp 52 is directed towards the ring-shaped deepening 60, wherein its outer diameter is somewhat smaller than the maximum outer diameter of the deepening 60. In the pressing process, stamp 52 presses the ring-shaped structure 30 into the deepening 60, wherein a radial deformation towards the inside beyond the deepening's edge is limited or respectively prevented by the inner stamp 56. Generation of a radial bead at the outer side takes place in the pressing process, as indicated at 62. The volume of the ring-shaped structure 30 relative to the volume of the deepening 60 is selected such that that the material is bead-like deformed towards the outside beyond the edge of the deepening. As the sealing material is very viscous, the deformation energy which has to be expended for the described process results in a sufficient pressing pressure, by which the sealing ring 64 that is being formed is brought into a sufficient adhesion joint with the entire wall of the deepening 60.

In the described operation of the applicator 10, the same can have a sufficiently high temperature with its tools altogether. The tool 50, which can be disposed at another location, can have room temperature or it may be cooled.

It is conceivable to form a ring-shaped structure like that designated by 28 also towards the inside, i.e. to provide the opening of the annular gap 26 not to be directed towards the outside, like in FIGS. 1 and 2, but towards the inside, for instance in the application of a seal to a shaft (not shown). In this case, the inner stamp 14 would be at least partly hollow, and the feeding system 20, 22 could be situated in the outer stamp 18.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for applying a sealing compound to a surface, wherein a ring-shaped structure is formed from a plasticized sealing compound and subsequently deposited on the surface, wherein:
   the plasticized sealing compound is annularly brought into a temperature-controlled annular gap having a variable gap width, said annular gap being disposed between an inner stamp and an outer stamp, said inner stamp having a lower flange and said outer stamp having a lower surface, said lower surface being constructed and arranged to mate with said lower flange,
   the sealing compound is completely squeezed out of the annular gap by fast reduction of the annular gap width to zero, and is formed to the ring-shaped structure and laid down on the surface thereafter,
   wherein the annular gap width is reduced with such a great velocity and the sealing compound is squeezed out with such a high velocity that any adherence of the melt on gap edges, as well as on surfaces neighboring to the annular gap, is avoided.

2. The method according to claim 1, wherein the ring-shaped structure is deposited on the surface immediately when it arises from the annular gap.

3. The method of claim 1, wherein the ring-shaped structure is subsequently pressed against the surface by a ring-shaped pressing tool, the tool is at room temperature or less, and formed to a planar sealing ring to provide a sealing surface.

4. A method of claim 1, wherein the plasticized sealing compound is radially squeezed out of the annual gap towards the outside of the annular gap.

5. The method of claim 4, wherein the plasticized sealing compound is squeezed out of the annular gap obliquely downwards from the annular gap.

6. A method of claim 1, wherein the plasticized sealing compound is radially squeezed out of the annual gap towards the inside of the annular gap.

7. A method of claim 6, wherein the plasticized sealing compound is squeezed out of the annual gap obliquely downwards from the annular gap.

8. The method of claim 1 wherein the ring-shaped structure is incorporated into a closure cap for containers.

9. The method of claim 1 wherein the emergence end of the annular gap is positioned with respect to the surface such that the ring-shaped structure contacts the surface as soon as it has been squeezed out of the annular gap, and a film possibly still existing between the closed annular gap and the ring-shaped structure is broken by subsequently lowering the surface.

10. The method of claim 1 wherein the ring-shaped structure is deposited on the inner side of a bottom of a twist-off cap and is subsequently pressed against a deepening by a pressing tool, wherein one single ring-shaped pressing stamp is used as the pressing tool and the volume of the ring-shaped structure relative to the volume of the deepening is dimensioned such that in the pressing process, the sealing compound is bead-like deformed beyond an edge of the deepening at least towards the outer side of the deepening.

* * * * *